United States Patent
Oshiumi et al.

(10) Patent No.: US 10,253,672 B2
(45) Date of Patent: Apr. 9, 2019

(54) VEHICLE CONTROL SYSTEM

(71) Applicant: TOYOTA JIDOSHA KABUSHIKI KAISHA, Toyota-shi, Aichi-ken (JP)

(72) Inventors: Yasuhiro Oshiumi, Gotemba (JP); Kensei Hata, Shizuoka-ken (JP); Takahito Endo, Shizuoka-ken (JP); Yushi Seki, Susono (JP); Katsuya Iwazaki, Susono (JP); Yasuyuki Kato, Numazu (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/821,277

(22) Filed: Nov. 22, 2017

(65) Prior Publication Data
US 2018/0149063 A1 May 31, 2018

(30) Foreign Application Priority Data
Nov. 25, 2016 (JP) .................... 2016-229316

(51) Int. Cl.
*F01N 9/00* (2006.01)
*F01N 3/02* (2006.01)
(Continued)

(52) U.S. Cl.
CPC ............ *F01N 9/002* (2013.01); *F01N 3/023* (2013.01); *F01N 3/0885* (2013.01); *F01N 3/20* (2013.01);
(Continued)

(58) Field of Classification Search
CPC ........ F01N 9/002; F01N 3/0885; F01N 3/023; F01N 3/20; F01N 2900/104;
(Continued)

(56) References Cited

U.S. PATENT DOCUMENTS

2007/0204601 A1* 9/2007 Ishii .................. B60K 6/48
60/295
2012/0124978 A1* 5/2012 Futonagane ............ F01N 9/002
60/311

(Continued)

FOREIGN PATENT DOCUMENTS

JP 2001001787 A 1/2001
JP 2005048620 A 2/2005
(Continued)

*Primary Examiner* — Rodney A Butler
(74) *Attorney, Agent, or Firm* — Hunton Andrews Kurth LLP

(57) ABSTRACT

A vehicle control system vehicle control system to remove deposition from the purification system without generating noises and vibrations is provided. The vehicle control system comprises a controller that operates the vehicle having an engine autonomously, and that removes deposition from a purification system. The controller is configured to: obtain an amount of deposition on the purification system; determine a presence of a passenger in the vehicle; and execute the removal control when an amount of the deposition on the purification system exceeds a threshold value. The threshold value includes a first threshold value used when the vehicle is propelled while carrying a passenger, and a second threshold value used when the vehicle is propelled autonomously without carrying a passenger that is smaller than the first threshold value.

10 Claims, 14 Drawing Sheets

(51) Int. Cl.
*F02D 41/02* (2006.01)
*G05D 1/00* (2006.01)
*F01N 3/08* (2006.01)
*F01N 3/023* (2006.01)
*F01N 3/20* (2006.01)

(52) U.S. Cl.
CPC ......... *F02D 41/025* (2013.01); *G05D 1/0088* (2013.01); *B60W 2550/12* (2013.01); *B60W 2550/20* (2013.01); *B60Y 2200/92* (2013.01); *F01N 2900/10* (2013.01); *F01N 2900/104* (2013.01); *F01N 2900/12* (2013.01); *F01N 2900/1606* (2013.01); *F01N 2900/1612* (2013.01); *Y10S 903/903* (2013.01)

(58) Field of Classification Search
CPC ......... F01N 2900/12; F01N 2900/1612; F01N 2900/10; F01N 2900/1606; F02D 41/025; G05D 1/0088; B60W 2550/12; B60W 2550/20; Y10S 903/903; B60Y 2200/92
See application file for complete search history.

(56) References Cited

U.S. PATENT DOCUMENTS

| | | |
|---|---|---|
| 2012/0209466 A1 | 8/2012 | Ogiso |
| 2014/0288743 A1 | 9/2014 | Hokoi et al. |
| 2014/0290223 A1* | 10/2014 | Kubo ............... F01N 9/002 60/286 |
| 2017/0096920 A1 | 4/2017 | Fujii |

FOREIGN PATENT DOCUMENTS

| | | |
|---|---|---|
| JP | 2008080875 A | 4/2008 |
| JP | 2008-286052 A | 11/2008 |
| JP | 2014-184892 | 10/2014 |
| JP | 2015-222027 A | 12/2015 |

* cited by examiner

VEHICLE CONTROL SYSTEM

CROSS REFERENCE TO RELATED APPLICATIONS

The present invention claims the benefit of priority to Japanese Patent Application No. 2016-229316 filed on Nov. 25, 2016 with the Japanese Patent Office, the entire contents of which are incorporated herein by reference in its entirety.

BACKGROUND

Field of the Invention

Embodiments of the present application relate to the art of a vehicle control system configured to operate a vehicle autonomously.

Discussion of the Related Art

US 2014/288743 A1 describes a hybrid vehicle having an engine and a motor. An operating mode of the hybrid vehicle taught by US 2014/288743 A1 is switched between a hybrid mode in which the vehicle is powered at least by an engine, and an electric vehicle mode in which the vehicle is powered by the motor. According to the teachings of US 2014/288743 A1, in a travel route to a destination, a section where a traveling load is lower than a predetermined load is set as an electric traveling priority section, and a section where a traveling load is higher than the predetermined load is set as a hybrid traveling priority section. In the travel route, the first the hybrid traveling priority section is set as a warm-up section for warming up a purification device. If the traveling load in the warm-up section is higher than the predetermined load, any of the electric traveling priority sections before the warm-up section is reset to the hybrid traveling priority section to warm up the purification device.

A conventional automobile having an engine is provided with a catalytic converter that converts toxic gases in exhaust gas to reduce oxides of nitrogen (NOx) or a purification system having a particulate filter for trapping particulate matter in exhaust gas. In the catalytic converter, sulfur oxide (SOx) contained in exhaust gas may accumulate on noble metal during operation of the engine. Consequently, a reactive area of the catalytic converter will be reduced gradually with the progress of such sulfur poisoning thereby reducing catalytic activity. On the other hand, the particulate filter may be clogged as a result of trapping the particulate matter during operation of the engine. Consequently, an engine output will be reduced and the particulate matter is emitted.

In order to remove Sox accumulating on the catalytic converter or remove the particulate matter from the filter, according to the conventional art, an operating condition of the engine is changed to alter the engine output, or unburnt fuel is supplied to an exhaust pipe to raise a temperature of the catalytic converter or the filter. However, vibrations and noises may be generated by changing an operating condition of the engine.

SUMMARY

Aspects of embodiments of the present disclosure have been conceived noting the foregoing technical problems, and it is therefore an object of the present disclosure is to provide a vehicle control system configured to remove deposition from the purification system without generating noises and vibrations.

The vehicle control system according to the embodiments of the present disclosure is applied to a vehicle having an engine that generates power by burning fuel, and a purification system that purifies exhaust gas. The vehicle control system comprises a controller that operates the vehicle autonomously without requiring a manual operation, and that executes a removal control to remove deposition from the purification system. In order to achieve the above-explained objective, according to the embodiment of the present disclosure, the controller is configured to: obtain an amount of deposition on the purification system; determine a presence of a passenger in the vehicle; and execute the removal control when an amount of the deposition on the purification system exceeds a threshold value. The threshold value includes a first threshold value used in a case that the vehicle is propelled while carrying a passenger, and a second threshold value used in a case that the vehicle is propelled autonomously without carrying a passenger that is smaller than the first threshold value.

In a non-limiting embodiment, the removal control may include a heating process to raise a temperature of the purification system by increasing an output power of the engine. In addition, the controller may be further configured to reduce an amount of increase in the output power of the engine to raise the temperature of the purification system in the case that the vehicle is propelled while carrying a passenger, in comparison with an amount of increase in the output power of the engine to raise the temperature of the purification system in the case that the vehicle is operated autonomously without carrying a passenger.

In a non-limiting embodiment, the controller may be further configured to: execute the removal control upon satisfaction of at least any one of a first execution condition as an ambient environmental condition, and a second execution condition as a condition of the vehicle; determine satisfaction of the execution condition while the vehicle is operated autonomously; and inhibit the heating process if the execution condition is not satisfied.

In a non-limiting embodiment, the first execution condition may include at least one of a fact that: animals and pedestrians are not present around the vehicle; the vehicle is travelling outside a residential area; and the vehicle is not traveling in a closed area.

In a non-limiting embodiment, the vehicle may comprise: a generator that translate the output power of the engine into electric power; and an electric storage device that is charged with the electric power generated by the generator.

In a non-limiting embodiment, the controller may be further configured to: calculate a required output power of the engine to execute the removal control based on an amount of increase in the output power of the engine to execute the removal control, and a required charging amount to the electric storage device; and reduce the amount of increase in the output power of the engine to raise the temperature of the purification system in the case that the vehicle is propelled while carrying a passenger, in comparison with the amount of increase in the output power of the engine to raise the temperature of the purification system in the case that the vehicle is operated autonomously without carrying a passenger.

In a non-limiting embodiment, the second execution condition may include at least one of a fact that: the electric storage device is in condition possible to be charged with an expected electric power resulting from raising the temperature of the purification system temperatures of the generator and the electric storage device are lower than a predetermined level.

In a non-limiting embodiment, the deposition may include particulate matter, the purification system may include a filter, and the removal control may include a particulate matter removal control for removing the particulate matter from the filter by burning the particulate matter.

In a non-limiting embodiment, the particulate matter removal control may include an air intake to the engine to raise a speed of the engine thereby increasing oxygen supply to the filter. In addition, the controller may be further configured to reduce an amount of increase in the speed of the engine to raise the temperature of the filter in the case that the vehicle is propelled while carrying a passenger, in comparison with an amount of increase in the speed of the engine to raise the temperature of the filter in the case that the vehicle is operated autonomously without carrying a passenger.

In a non-limiting embodiment, the exhaust gas may include nitrogen oxide and sulfur oxide, the purification system may include a catalytic converter having noble metal for reducing nitrogen oxide, and the removal control may include a catalyst regeneration to eliminate sulfur oxide from the catalytic converter.

Thus, according to the embodiments of the present disclosure, the vehicle control system executes the removal control to remove deposition from the purification system upon exceedance of the amount of the deposition on the purification system, and when the vehicle is propelled while carrying a passenger, the second threshold value that is smaller than the first threshold value is used to execute the removal control. According to the embodiments of the present disclosure, therefore, the removal control is carried out more frequently in the case that the vehicle is operated autonomously without carrying a passenger in comparison with the case that the vehicle travels while carrying a passenger. For this reason, noises and vibrations resulting from execution of the removal control may be reduced during propulsion of the vehicle while carrying a passenger.

In addition, the amount of increase in the output power of the engine to raise the temperature of the purification system is reduced in the case that the vehicle is propelled while carrying a passenger, in comparison with that of the case in which the vehicle is operated autonomously without carrying a passenger. According to the embodiments of the present disclosure, therefore, noises and vibrations resulting from execution of the removal control may be reduced during propulsion of the vehicle while carrying a passenger. In addition, temperature of the purification system may be raised quickly when the vehicle is operated autonomously without carrying a passenger.

Further, the amount of increase in the speed of the engine to raise the temperature of the filter is reduced in the case that the vehicle is propelled while carrying a passenger, in comparison with that of the case in which the vehicle is operated autonomously without carrying a passenger. According to the embodiments of the present disclosure, therefore, noises and vibrations resulting from execution of the removal control may be reduced during propulsion of the vehicle while carrying a passenger. In addition, the deposition accumulating on the purification system may be eliminated quickly when the vehicle is operated autonomously without carrying a passenger.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Preferred embodiments of the present application will now be explained with reference to the accompanying drawings.

Figure 1:
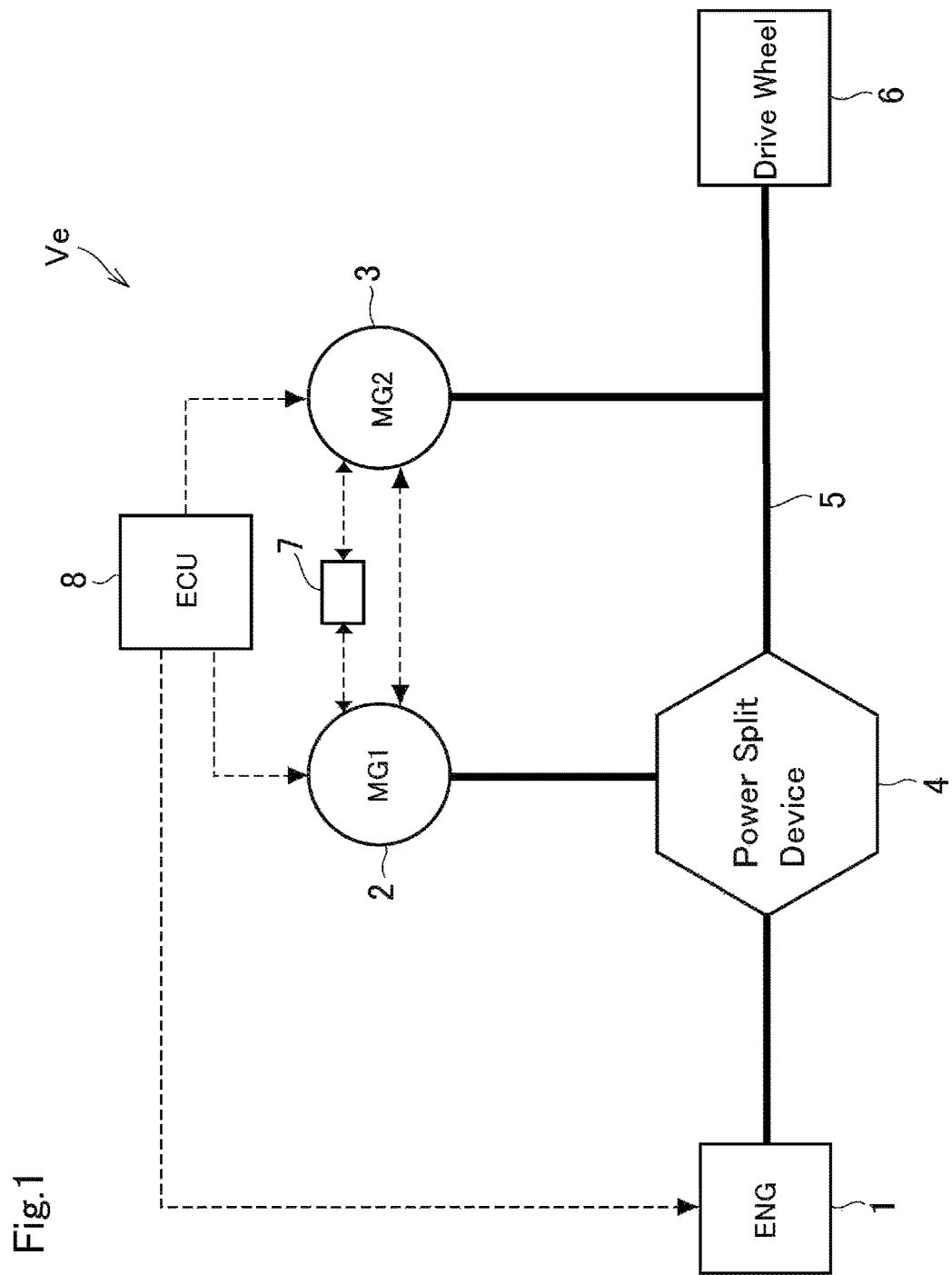
FIG. 1 is a schematic illustration showing a first example of a powertrain of the vehicle to which the control system according to the present disclosure is applied.

Referring now to FIG. 1, there is schematically shown a first example of a powertrain of a hybrid vehicle Ve to which the control system according to the present disclosure is applied. As shown in FIG. 1, a prime mover of the vehicle Ve includes an engine (referred to as "ENG" in FIG. 1) 1, a first motor (referred to as "MG1" in FIG. 1) 2 and a second motor (referred to as "MG2" in FIG. 1) 3. The vehicle Ve comprises a power split device 4, an output member 5, drive wheels 6, a battery 7 as an electric storage device electrically connected to the motors 2 and 3, and a controller 8.

Specifically, an internal combustion engine such as a gasoline engine and a diesel engine may be used as the engine 1. An output power of the engine 1 may be adjusted electrically, and the engine 1 may be started and stopped electrically according to need. For example, given that the gasoline engine is used as the engine 1, an opening degree of a throttle valve, an amount of fuel supply, a commencement and a termination of ignition, an ignition timing etc. may be controlled electrically.

A permanent magnet type synchronous motor or an induction motor having a generating function, that is, a motor-generator may be used individually as the first motor 2 and the second motor 3. The first motor 2 and the second motor 3 are connected to each other through a battery 7 and an inverter or a converter (not shown) so that rotational speeds and torques thereof can be controlled responsive to a current applied thereto, and hence those motor 2 and 3 can be operated selectively as a motor and a generator. In the vehicle Ve shown in FIG. 1, therefore, an output power of the engine 1 may be converted partially into an electric power, and the electric power thus converted may be supplied to the second motor 3 to generate torque for rotating the drive wheels 6 to propel the vehicle Ve. Both of the first motor 2 and the second motor 3 may be operated as a generator, and the battery 7 may be charged with electricity generated by the first motor 2 and the second motor 3.

The power split device 4 is a planetary gear unit comprising an input element, a reaction element and an output element (neither of which are shown). In the power split device 4, the input element is connected to the engine 1, the reaction element is connected to the first motor 2, and the output element is connected to the drive wheels 6 through an output member 5. The second motor 3 is also connected to the output member 5 so that torque generated by the second motor 3 may also be applied to the drive wheels 6. In the vehicle Ve, an output torque of the engine 1 is distributed to the first motor 2 and to the drive wheels 6 through the power split device 4, and an output torque of the first motor 2 is delivered not only to the drive wheels 6 but also to the engine 1 to start the engine 1. That is, the vehicle Ve shown in FIG. 1 is a so-called "input-split type" hybrid vehicle.

In the vehicle Ve, not only front wheels but also rear wheels may serve as the drive wheels 6. Alternatively, all of the front and rear wheels may be rotated to serve as the drive wheels 6. Each of the front wheels and rear wheels is individually provided with a brake device (not shown), and any one of the pairs of the front wheels and the rear wheels is connected to a steering device (not shown).

In order to electrically control the vehicle Ve, the vehicle Ve is provided with a controller (referred to as "ECU" in FIG. 1) 8 as an electronic control unit composed mainly of a microcomputer. For example, detection signals and information from an after-mentioned external sensor 11, a GPS receiver 12, an internal sensor 13, a map database 14, a navigation system 15 and so on are sent to the controller 8. The controller 8 may be configured to communicate with an inter-vehicle communication system to exchange data therebetween. Specifically, the controller 8 is configured to carry out a calculation based on incident data as well as data and formulas installed in advance, and to transmit calculation results in the form of command signals to the above-mentioned elements and after-mentioned actuator 16 and auxiliary 17.

An operating mode of the vehicle Ve may be selected from a hybrid mode (to be abbreviated as the "HV mode" hereinafter) in which the vehicle Ve is powered at least by the engine 1, and an electric vehicle mode (to be abbreviated as the "EV mode" hereinafter) in which the vehicle Ve is powered by at least one of the first motor 2 and the second motor 3 while stopping the engine 1. The HV mode may be selected from a first HV mode in which the vehicle Ve is powered only by the engine 1, a second HV mode in which the vehicle Ve is powered by the engine 1 and at least one of the first motor 2 and the second motor 3, and a third HV mode in which the vehicle Ve is powered by the engine 1 while operating one of the motors 2 and 3 as a generator by the engine 1. On the other hand, the EV mode may be selected from a single-motor mode in which the vehicle Ve is powered only by the second motor 3, and a dual-motor mode in which the vehicle Ve is powered by both of the first motor 2 and the second motor 3.

The control system according to the embodiments of the present disclosure is configured to operate the vehicle Ve autonomously. Specifically, the control system is configured to execute a starting operation, an accelerating operation, a steering operation, a braking operation, a stopping operation and etc. of the vehicle Ve completely autonomously at the level 4 defined by the NHTSA (National Highway Traffic Safety Administration) or the level 4 or 5 defined by the SAE (Society of Automotive Engineers), while recognizing and observing an external condition and a travelling condition. For this reason, the vehicle Ve may be operated not only autonomously with or without a driver (and a passenger) but also manually by the driver.

Figure 2:
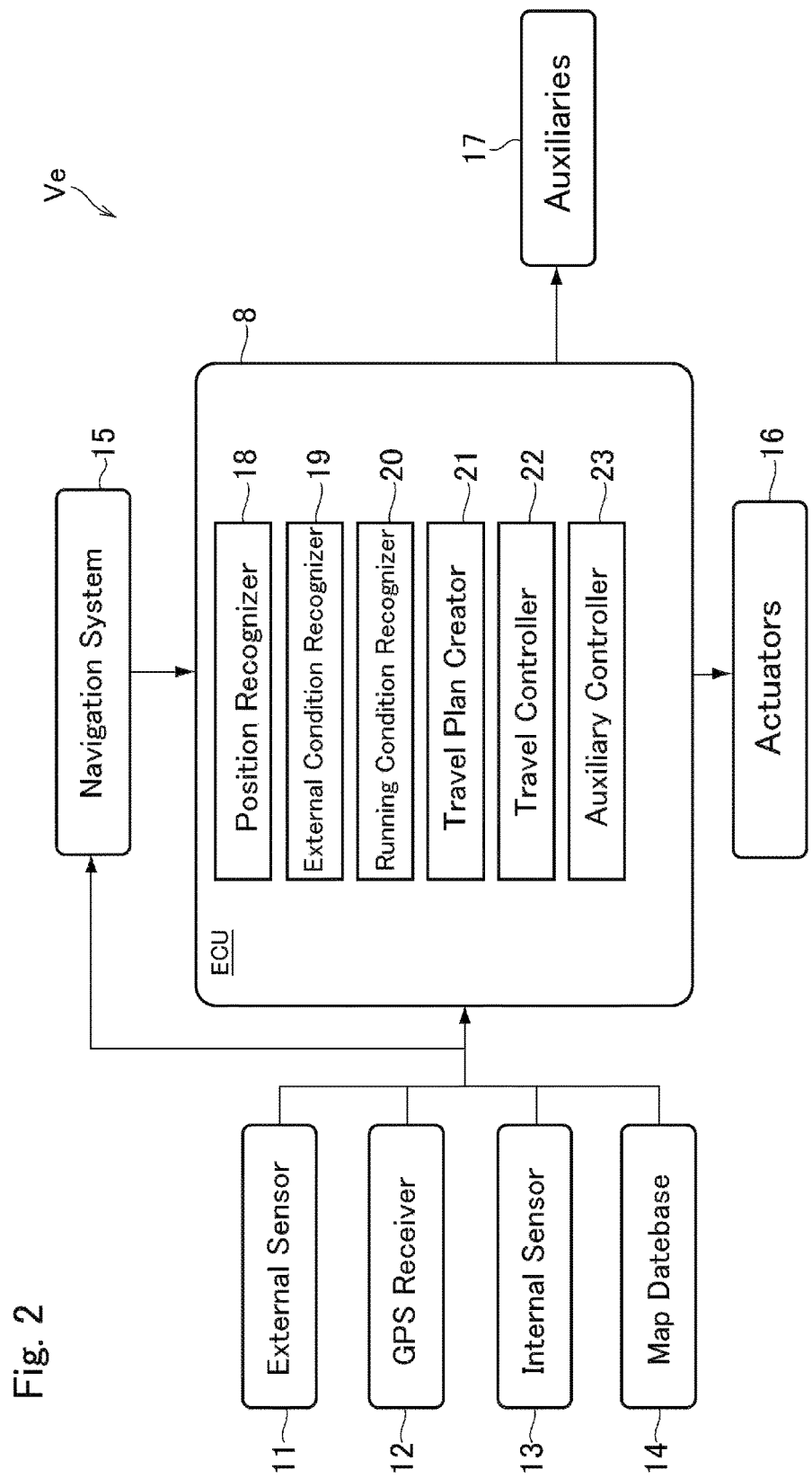
FIG. 2 is a schematic illustration showing a control system of the vehicle.

Configuration of the controller 8 is shown in FIG. 2 in more detail. As shown in FIG. 2, detection signals and information from the external sensor 11, the GPS receiver 12, the internal sensor 13, the map database 14, the navigation system 15 and so on are sent to the controller 8. Although only one controller 8 is depicted in FIG. 2, a plurality of controllers may be arranged in the vehicle Ve to control the above-mentioned devices individually.

The external sensor 11 includes at least one of the following external sensors for detecting an external condition, such as an on-board camera, a RADAR (i.e., a radio detection and ranging) a LIDAR (i.e., a laser imaging detection and ranging), an ultrasonic sensor and so on.

Specifically, the on-board camera is arranged e.g., in a front part and both sides of the vehicle Ve, and transmits recorded information about the external condition to the controller 8. To this end, not only a monocular camera but also a stereo camera having a plurality of lenses and image sensors to achieve a binocular vision may be used as the on-board camera. If the stereo camera is used as the on-board camera, the controller 8 is allowed to obtain three-dimensional information of the recorded object.

The RADAR is adapted to detect obstacles utilizing radio waves such as millimetric-waves and microwaves, and to transmit detected information to the controller 8. Specifically, the RADAR detects an obstacle such as other vehicles and so on by emitting radio waves and analyzing the radio waves reflected from the obstacle.

The LIDAR (or a laser sensor and a laser scanner) is adapted to detect obstacles utilizing laser light and to transmit detected information to the controller 8. Specifically, the LIDAR detects an obstacle such as other vehicles and so on by emitting laser light and analyzing the laser light reflected from the obstacle.

The ultrasonic sensor is adapted to detect obstacles utilizing ultrasonic and to transmit detected information to the controller 8. Specifically, the ultrasonic sensor detects an obstacle such as other vehicles and so on by emitting ultrasonic and analyzing the ultrasonic reflected from the obstacle.

The GPS receiver is adapted to obtain a position (i.e., latitude and longitude) of the vehicle Ve based on incident signals from GPS satellites, and to transmit the positional information to the controller 8.

The internal sensor 13 is adapted to detect operating conditions and behaviors of the constituent elements of the vehicle Ve. Specifically, the internal sensor 13 includes a vehicle speed sensor for detecting a speed of the vehicle Ve, an engine speed sensor for detecting a speed of the engine 1, a motor speed sensor (or a resolver) for detecting speeds of the motors 2 and 3, a throttle opening sensor for detecting an opening degree of a throttle valve, a brake sensor (or switch) for detecting a depression of a brake pedal, an accelerator sensor for detecting a position of an accelerator pedal, a steering sensor for detecting a steering angle of the steering device, a longitudinal acceleration sensor for detecting a longitudinal acceleration of the vehicle Ve, a lateral acceleration sensor for detecting a lateral acceleration of the vehicle Ve, a yaw rate sensor for detecting a yaw rate of the vehicle Ve, a battery sensor for detecting a state of charge (to be abbreviated as the "SOC" hereinafter) level of the battery 7, a seat sensor for detecting an occupant sitting on a vehicle seat, a seatbelt sensor for detecting a fastening of a seatbelt, a biometric passenger sensor or a motion sensor for detecting a driver or passenger sitting on the vehicle seat, temperature sensors for measuring temperatures of coolant for cooling the engine 1 and the inverter and temperatures of the motors 2 and 3, and a below-mentioned sensor 48 for detecting a pressure loss of a below-mentioned filter 46.

The map database 14 may be installed in the controller 8, but map information stored in external online information processing systems may also be available.

The navigation system 15 is configured to determine a travelling route of the vehicle Ve based on the positional information obtained by the GPS receiver 12 and the map database 14.

The controller 8 carries out calculations based on the incident data or information from the external sensor 11, the GPS receiver 12, the internal sensor 13, the map database 14 and the navigation system 15, and calculation results are sent in the form of command signal to the actuators 16 of the elements to be actuated to operate the vehicle Ve autonomously and the auxiliaries 17.

The actuators 16 include actuators for operating the engine 1, the first motor 2, and the second motor 3 such as a throttle actuator, a brake actuator, a steering actuator and so on, and the vehicle Ve may be operated autonomously by manipulating the actuators 16.

Specifically, the throttle actuator changes an opening degree of the throttle valve of the engine 1 to generate a required power in accordance with the control signal transmitted from the controller 8. The brake actuator controls the brake device to generate a required braking force applied to the drive wheels 6 in accordance with the control signal transmitted from the controller 8. The steering actuator actuates an assist motor of an electric power steering device to turn the vehicle Ve in accordance with the control signal transmitted from the controller 8.

The auxiliaries 17 include devices that are not involved in propulsion of the vehicle Ve such as a wiper, a headlight, a direction indicator, an air conditioner, an audio player and so on.

The controller 8 includes a position recognizer 18, an external condition recognizer 19, a running condition recognizer 20, a travel plan creator 21, a travel controller 22, an auxiliary controller 23 and so on.

The position recognizer 18 is configured to recognize a current position of the vehicle Ve on a map based on positional information received by the GPS receiver 12 and the map database 14. The current position of the vehicle Ve may also be obtained from the positional information used in the navigation system 15. Optionally, the vehicle Ve may also be adapted to communicate with external sensors and signposts arranged along the road to obtain the current position of the vehicle Ve.

The external condition recognizer 19 is configured to recognize external condition of the vehicle Ve such as a location of a traffic lane, a road width, a road configuration, a road gradient, an existence of obstacles around the vehicle Ve and so on, based on the recorded information of the on-board camera, or detection data of the RADAR or the LIDAR. Optionally, weather information, a friction coefficient of road surface etc. may be obtained according to need.

The running condition recognizer 20 is configured to recognize running condition of the vehicle Ve such as a vehicle speed, a longitudinal acceleration, a lateral acceleration, a yaw rate and so on based on detection result of the internal sensors 13.

The travel plan creator 21 is configured to create a travel locus of the vehicle Ve based on a target course determined by the navigation system 15, a position of the vehicle Ve recognized by the position recognizer 18, and an external condition recognized by the external condition recognizer 19. That is, the travel plan creator 21 creates a travel locus of the vehicle Ve within the target course in such a manner that the vehicle Ve is allowed to travel safely and properly while complying traffic rules. In addition, the travel plan creator 21 is further configured to create a travel plan in line with the travel locus and the target course created based on the recognized external conditions and the map database 14.

Specifically, the travel plan is created based on prospective data after few seconds from the present moment to determine a future condition of the vehicle Ve such as a driving force or the like required in future. Optionally, the travel plan may also be created based on prospective data after several ten seconds depending on the external conditions and the running conditions. Thus, the travel plan creator 21 creates a future plan to change a vehicle speed, acceleration, steering torque etc. during travelling along the target course in the form of e.g., a map.

Alternatively, the travel plan creator 21 may also create a pattern to change the vehicle speed, acceleration, steering torque etc. between predetermined points on the travel locus. Specifically, such patterns may be determined by setting target values of those parameters at each point on the travel locus taking account of a required time to reach the point at the current speed.

The travel controller 22 is configured to operate the vehicle Ve autonomously in line with the travel plan created by the travel plan creator 21. To this end, specifically, the travel controller 22 transmits command signals to the throttle actuator, the brake actuator, the steering actuator, the engine 1, the first motor 2, the second motor 3 and so on in accordance with the travel plan.

The auxiliary controller 23 is configured to operate the auxiliaries 17 such as the wiper, the headlight, the direction indicator, the air conditioner, the audio player and so on in line with the travel plan created by the travel plan creator 21.

Details of autonomous operation of the vehicle in line with the travel plan are described in more detail in the publication of JP-A-2016-99713. According to the embodiments of the present disclosure, the vehicle Ve may be operated completely autonomously utilizing e.g., the teachings of JP-A-2016-99713.

Figure 3:
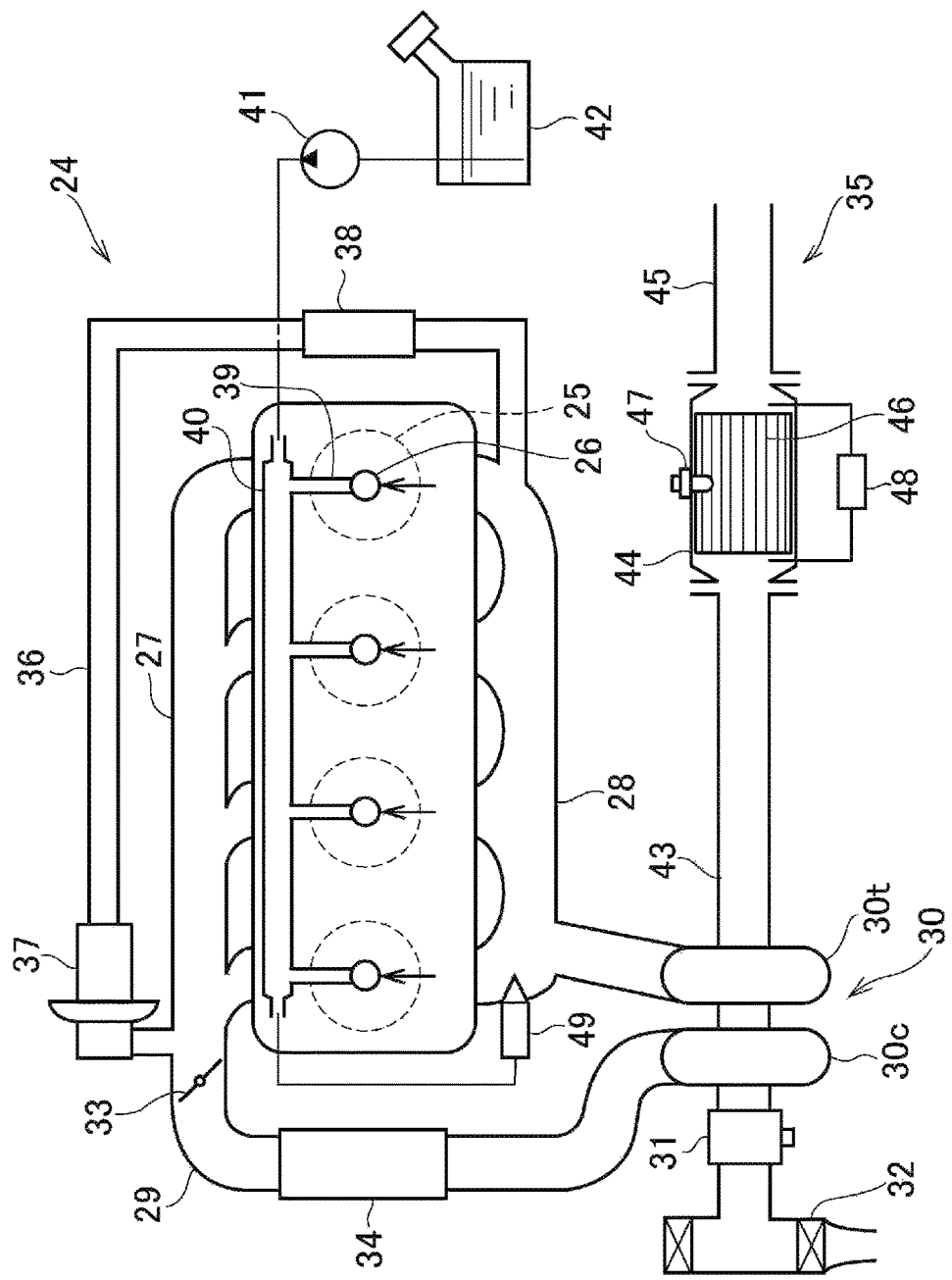
FIG. 3 is a schematic illustration showing a structure of the engine.

Here will be explained a structure of the engine 1 with reference to FIG. 3. As illustrated in FIG. 3, four cylinders 25 are arranged in a main body 24 of the engine 1, and each of the cylinders 25 is individually provided with an electronic fuel injection valve 26. An intake manifold 27 is connected individually to each of the cylinders 25 through an intake valve (not shown) that is opened and closed in conjunction with a reciprocating motion of a piston (not shown). Likewise, an exhaust manifold 28 is connected to each of the cylinders 25 through an exhaust valve (not shown) that is opened and closed in conjunction with the reciprocating motion of the piston (not shown).

The intake manifold 27 is also connected to an outlet of a compressor 30c of a turbocharger 30 through an intake duct 29, and the outlet of the compressor 30c is connected to an air cleaner 32 through an air flow meter 31. An electronic throttle valve 33 is disposed in the intake duct 29, and a cooling device 34 is arranged in the vicinity of the intake duct 29. The exhaust manifold 28 is also connected to an inlet of an exhaust turbine 30t of the turbocharger 30, and an outlet of the exhaust turbine 30t is connected to a purification system 35.

The intake manifold 27 and the exhaust manifold 28 are connected to each other through an exhaust gas recirculation (to be abbreviated as the "EGR" hereinafter) passage 36. An electronic EGR control valve 37 is disposed in the EGR passage 36, and a cooling device 38 is arranged around the EGR passage 36 to cool EGR gas flowing through the EGR passage 36. The fuel injection valves 26 are individually connected to a common-rail 40 through fuel-feeding pipes 39. Fuel is supplied to the common-rail 40 from a fuel tank 42 by an electrically variable fuel pump 41, and the fuel injected to the common-rail 40 is further delivered to the fuel injection valves 26 through the fuel-feeding pipes 39.

The purification system 35 comprises a first exhaust pipe 43 connected to the outlet of the exhaust turbine 30t, a catalytic converter 44 connected to the first exhaust pipe 43, a second exhaust pipe 45 connected to the catalytic converter 44, and a wall-flow particulate filter (as will be simply called the "filter" hereinafter) 46 is arranged in the catalytic converter 44.

The catalytic converter 44 is further provided with a temperature sensor 47 for measuring a temperature of the filter 46, and a pressure loss sensor 48 for measuring a pressure loss of the filter 46. Alternatively, the pressure loss of the filter 46 may also be measured based on a difference between an upstream pressure and a downstream pressure of the filter 46.

A fuel distribution valve 49 is disposed on the exhaust manifold 28 so that the fuel is distributed to the fuel distribution valve 49 from the common-rail 40. The fuel is further distributed from the fuel distribution valve 49 to the exhaust manifold 28. The fuel distribution valve 49 may also be arranged in the first exhaust pipe 43 to distribute the fuel from the cylinders 25 to the purification system 35.

The engine 1 is provided with the catalytic converter 44 to reduce nitrogen oxide (NOx) resulting from fuel combustion to nitrogen. In the catalytic converter 44, noble metal such as platinum is used as a catalyst, and sulfur oxide (SOx) contained in exhaust gas may accumulate on a reaction surface of the catalytic converter 44 during operation of the engine 1. Consequently, an area of the reaction surface of the catalytic converter 44 will be reduced gradually with the progress of such sulfur poisoning thereby reducing catalytic activity to reduce NOx. On the other hand, the filter 46 may be clogged as a result of trapping particulate matter resulting from fuel combustion during operation of the engine 1. Consequently, the exhaust gas may not be discharged sufficiently to outside thereby reducing an engine output. In addition, when the filter 46 is saturated, trapping performance of the filter 46 may be reduced and consequently the particulate matter will be emitted.

In the prior art, sulfur poisoning is reduced by eliminating sulfur oxide from the catalytic converter by raising a temperature of the catalytic converter (i.e., catalyst regeneration), and clogging of the filter is dissolved by raising a temperature of the filter while increasing oxygen to burn the particulate matter accumulating on the filter (i.e., PM removal). Here, the temperature of the catalytic converter and the temperature of the filter are raised to a similar target temperature in both catalyst regeneration and PM removal.

In the catalyst regeneration and the PM removal, temperatures of the catalytic converter and the filter may be raised by changing an operating condition of the engine. For example, temperatures of the catalytic converter and the filter may be raised by operating the engine at an operating point slightly deviated from the most fuel efficient point to generate greater power than required power. Alternatively, temperatures of the catalytic converter and the filter may also be raised by retarding an ignition timing of the engine. However, fuel efficiency may be reduced as a result of execution of the catalyst regeneration and the PM removal, and hence it is preferable to reduce a frequency of execution of the catalyst regeneration and the PM removal. In addition, shocks and noises may be generated as a result of execution of the catalyst regeneration and the PM removal. According to the embodiments of the present disclosure, therefore, the vehicle control system is configured to execute the catalyst regeneration and the PM removal mostly when the vehicle Ve is operated autonomously without carrying a passenger.

Figure 4:
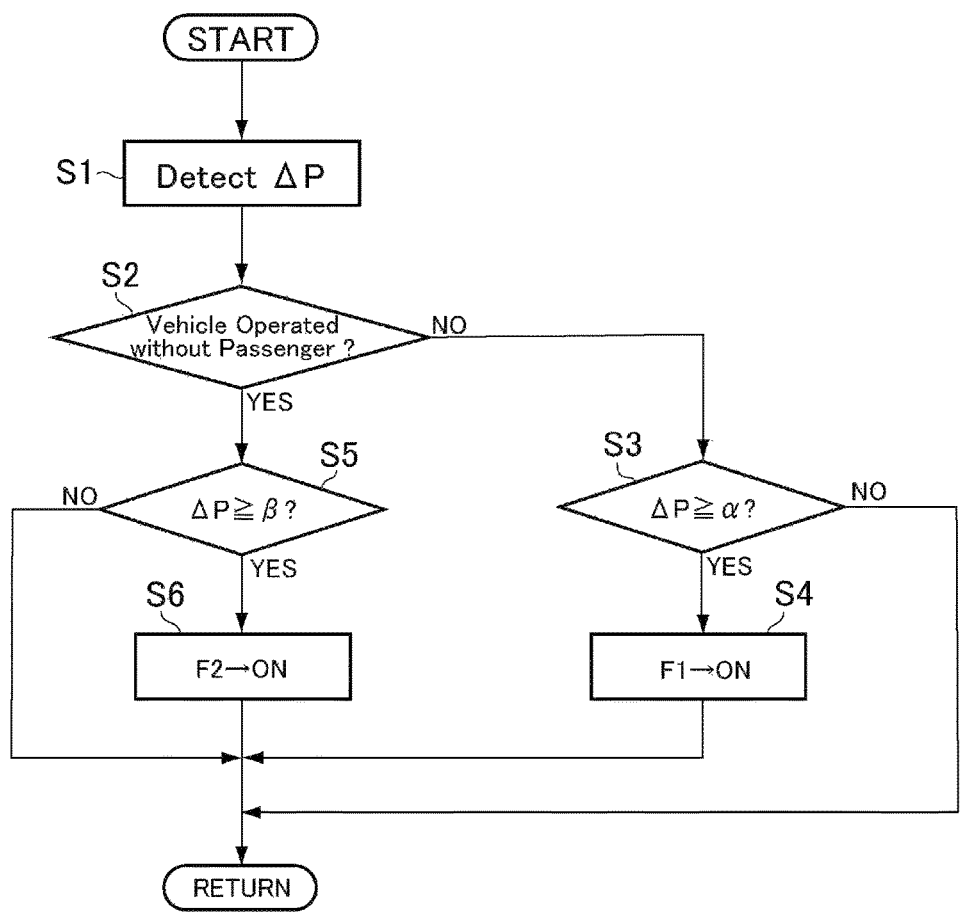
FIG. 4 is a flowchart showing a control example of determining a presence of a passenger in the vehicle.

To this end, the vehicle control system according to the embodiments of the present disclosure executes a routine shown in FIG. 4. First of all, at step S1, a pressure difference ΔP between an upstream pressure and a downstream pressure of the filter 46 is measured by the pressure loss sensor 48. That is, at step S1, an accumulation amount of the particulate matter on the filter 46 is measured based on the pressure difference ΔP between the upstream pressure and the downstream pressure of the filter 46. Alternatively, an accumulation amount of the particulate matter on the filter 46 may also be estimated based on operating time of the engine 1 and engine load, or other appropriate means.

Then, it is determined at step S2 whether or not the vehicle Ve is operated autonomously without carrying a passenger. For example, a presence of the passenger in a vehicle compartment may be determined based on a detection signal of a body temperature of the passenger from a biometric passenger sensor such as an infrared sensor, or a detection signal of a body movement of the passenger from a motion sensor such as a Doppler sensor. Alternatively, such determination at step S2 may also be made based on an operating state or activating state of the devices arranged in the vehicle compartment. In this case, a presence of the passenger may be determined based on a fact that a power switch, an ignition switch, a start button or the like is manually turned on.

If the vehicle Ve travels while carrying a passenger so that the answer of step S2 is NO, the routine progresses to step S3 to determine whether or not the pressure difference ΔP detected at step S1 is equal to or greater than a first reference value (or a first threshold value) α. That is, at step S3, it is determined whether or not the particulate matter accumulating on the filter 46 has to be removed. To this end, the first reference value α is set within a range where reduction in power output and combustion efficiency of the engine 1 will not be caused by a rise in back pressure of the cylinders 25 resulting from particulate matter accumulation on the filter 46. That is, the controller 8 determines that the particulate matter accumulates on the filter 46 in an amount to be removed in a case that the pressure difference ΔP is greater than the first reference value α. Thus, at step S3, execution of the PM removal from the filter 46 is determined based on the pressure difference ΔP between the upstream pressure and the downstream pressure of the filter 46.

If the pressure difference ΔP is smaller than the first reference value α so that the answer of step S3 is NO, the routine returns without carrying out the PM removal. By contrast, if the pressure difference ΔP is equal to or greater than the first reference value α so that the answer of step S3 is YES, the routine progresses to step S4 to turn on a first flag F1 representing a necessity of execution of the PM removal, and then returns.

If the vehicle Ve is operated autonomously without carrying a passenger so that the answer of step S2 is YES, the routine progresses to step S5 to determine whether or not the pressure difference ΔP detected at step S1 is equal to or greater than a second reference value (or a second threshold value) ß. As step S3, the necessity of execution of the PM removal from the filter 46 is also determined at step S5 based on the pressure difference ΔP. However, the second reference value ß is smaller than the first reference value α so that the PM removal from the filter 46 will be carried out when the accumulation of the particulate matter on the filter 46 reaches a smaller reference value. That is, the PM removal from the filter 46 is carried out more frequently in the case that the vehicle Ve is operated autonomously without carrying a passenger, in comparison with the case that the vehicle Ve travels while carrying a passenger.

If the pressure difference ΔP is smaller than the second reference value ß so that the answer of step S5 is NO, the routine returns without carrying out the PM removal. By contrast, if the pressure difference ΔP is equal to or greater than the second reference value 13 so that the answer of step S5 is YES, the routine progresses to step S6 to turn on a second flag F2 representing a necessity of execution of the PM removal during propulsion without carrying a passenger, and then returns.

Thus, the second reference value ß to turn on the second flag F2 is smaller than the first reference value α to turn on the first flag F1. That is, the second flag F2 representing a necessity to execute the PM removal when the accumulation of the particulate matter on the filter 46 reaches the smaller reference value. As a result of executing the PM removal from the filter 46 during autonomous propulsion without carrying a passenger, the pressure difference ΔP between the upstream pressure and the downstream pressure of the filter 46 is reduced thereby reducing the frequency of carrying out the PM removal during propulsion while carrying a passenger. For this reason, noises and vibrations relating to the PM removal will not be generated when the vehicle travels while carrying a passenger.

Since the vehicle Ve is a means of transportation, the vehicle Ve carries a passenger in most cases. According to the embodiment of the present disclosure, however, the flag representing a necessity of execution of the PM removal from the filter 46 is turned on more frequently during autonomous propulsion without carrying a passenger. For this reason, the PM removal is executed during autonomous propulsion without carrying a passenger in most cases.

Figure 5:
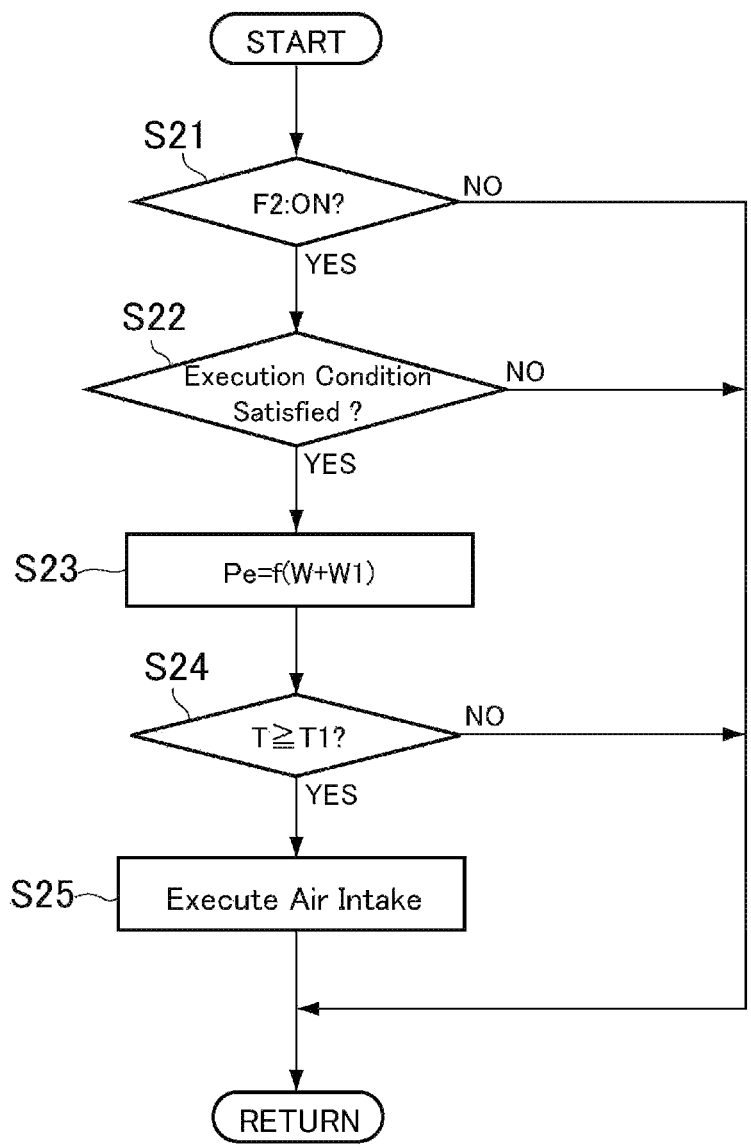
FIG. 5 is a flowchart showing a control example of removing the particulate matter when the vehicle is operated without carrying a passenger.
Figure 6:
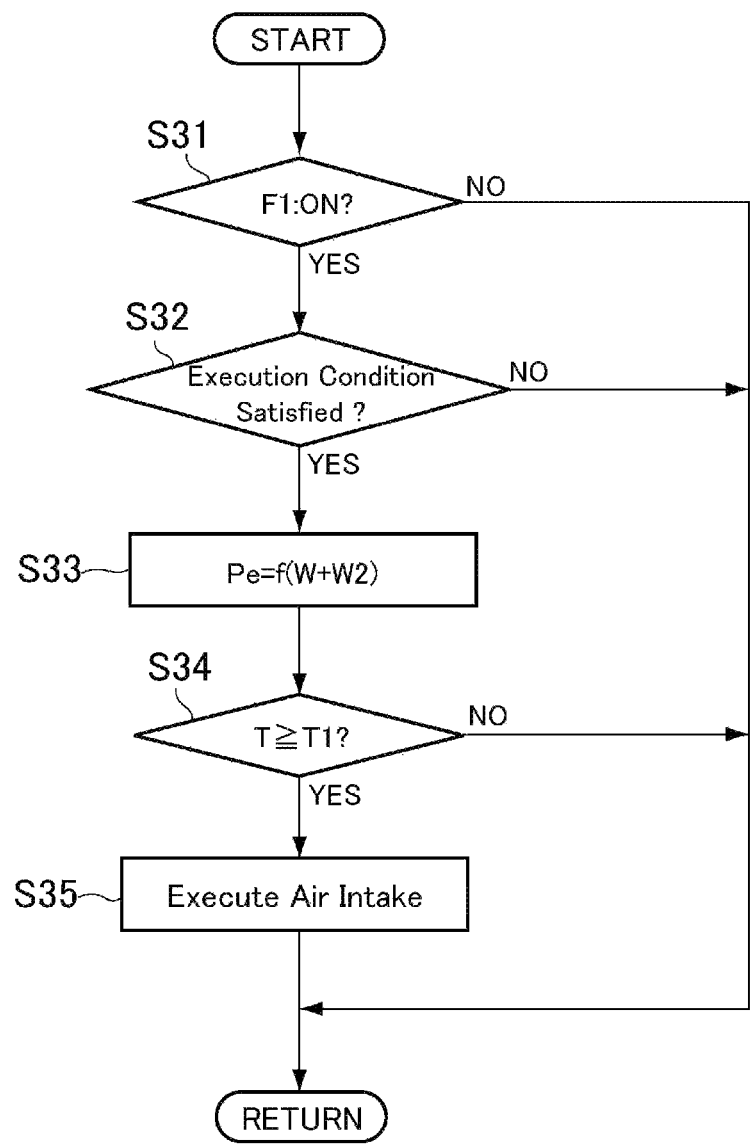
FIG. 6 is a flowchart showing a control example of removing the particulate matter when the vehicle is operated while carrying a passenger.

According to the embodiment of the present disclosure, routines shown in FIGS. 5 and 6 are also executed in conjunction with the routine shown in FIG. 4. In the routine shown in FIG. 5, first of all, it is determined at step S21 whether or not the second flag F2 is turned on. That is, at step S21, it is determined whether or not the PM removal from the filter 46 is required during autonomous propulsion without carrying a passenger.

If the second flag F2 is turned off so that the answer of step S21 is NO, the routine returns. By contrast, if the second flag F2 is turned on so that the answer of step S21 is YES, the routine progresses to step S22 to determine a satisfaction of an execution condition of the PM removal. As a result of burning the particulate matter accumulating on the filter 46 to remove from the filter 46, carbon dioxide ($CO_2$) emissions are increased. For this reason, the execution condition of the PM removal is satisfied upon satisfaction of the following ambient environmental conditions as a "first condition". Specifically, the first condition of the PM removal is satisfied only when all of the following conditions are met: animals and pedestrians are not present around the vehicle Ve; the vehicle Ve is travelling outside a residential area; and the vehicle Ve is not traveling in a closed area such as a tower parking. Those conditions may be detected by the external condition recognizer 19, the infrared sensor, and the on-board camera.

The PM removal includes a heating step (or a heating process) to raise a temperature of the filter 46 by increasing an output power of the engine 1. During heating the filter 46, surplus output of the engine 1 is translated into electricity by the first motor 2 or the second motor 3, and the battery 7 is charged with the resultant electricity. In this situation, the battery 7 may be overcharged. In addition, a temperature of the engine 1 may be raised excessively, and temperatures of the first motor 2 or the second motor 3 and an inverter controlling the first motor 2 and the second motor 3 may also be raised excessively. Further, the fuel may be consumed excessively.

In order to avoid the above-mentioned disadvantages, the execution condition of the PM removal from the filter 46 may include conditions of the vehicle Ve as a "second condition". In this case, the execution condition of the PM removal is satisfied upon satisfaction of both of the first condition and the second condition. Specifically, the second condition of the PM removal is satisfied only when all of the following conditions are met: the battery 7 is in condition possible to be charged with an expected electricity resulting from the PM removal, that is, an input electric power (Win) is smaller than a predetermined value; a state of charge level of the battery 7 is lower than a predetermined level; temperatures of the first motor 2, the second motor 3, and the inverter are lower than a predetermined level, a temperature of coolant for cooling the engine 1 and the inverter is lower than a predetermined level; and a fuel level is higher than a predetermined level. In addition, a temperature (or an ambient temperature) of the battery 7 may also be included in the second condition to determine a possibility to charge the battery 7.

If the execution condition of the PM removal is not satisfied so that the answer of step S22 is NO, the routine returns. By contrast, if the execution condition of the PM removal is satisfied so that the answer of step S22 is YES, the routine progresses to step S23 to execute the PM removal from the filter 46. In order to execute the RM removal, at step S23, a required output power Pe of the engine 1 to execute the PM removal is calculated by adding a first amount W1 as an amount of increase in the output power of the engine 1 to execute the PM removal, to a required charging amount W to the battery 7. Specifically, the first amount W1 is set to a value possible to raise a temperature of the filter 46 to a level at which the particulate matter accumulating on the filter 46 is burnt, and the first amount W1 is greater than an after-mentioned second amount W2 used to execute the PM removal in the case that the a passenger is present in the vehicle Ve. Since the first amount W1 is greater than the second amount W2, larger noise will be generated as a result of carrying out the PM removal during operating the vehicle Ve autonomously without carrying a passenger. However, no one feels such engine noise.

Optionally, the first amount W1 may be differentiated depending on whether or not the vehicle is propelled. In addition, a temperature of the filter 46 may also be increased by supplying fuel from the fuel distribution valve 49 to the first exhaust pipe 43 thereby causing a burning reaction in the first exhaust pipe 43, in addition to increase the output power of the engine 1. Further, the PM removal may also be executed in combination with an ignition retard of the engine 1. In this case, a reduction in the output power of the engine 1 resulting from execution of the ignition is compensated by further increasing a required engine power to ensure driving force. By executing the ignition retard, unburnt fuel contained in the exhaust gas is increased so that a temperature in the first exhaust pipe 43 is raised thereby raising a temperature of the filter 46.

Then, it is determined at step S24 whether or not a temperature T of the filter 46 is equal to or higher than a threshold temperature T1. To this end, the temperature of the filter 46 may be measured not only by the temperature sensor 47 but also estimated based on an engine load. The threshold temperature T1 is set to a level at which the particulate matter can be burnt by increasing oxygen at a place where the filter 46 is arranged.

If the temperature T of the filter 46 is lower than the threshold temperature T1 so that the answer of step S24 is NO, the routine returns. By contrast, if the temperature T of the filter 46 is equal to or higher than the threshold temperature T1 so that the answer of step S24 is YES, the routine progresses to step S25 to execute air intake to the engine 1 so as to increase oxygen at the place where the filter 46 is arranged, and then the routine returns. For example, oxygen supply to the filter 46 may be increased by increasing air/fuel ratio of air/fuel mixture supplied to the cylinders 25 so as to increase oxygen contained in the exhaust gas. Alternatively, oxygen supply to the filter 46 may also be increased by raising a speed of the engine 1 by the first motor 2 to increase flow rate per unit of time of the exhaust gas emitted from the cylinders 25 to the filter 46.

FIG. 6 shows a routine executed when the vehicle is propelled while carrying a passenger. In the routine shown in FIG. 6, first of all, it is determined at step S31 whether or not the first flag F1 is turned on. That is, at step S31, it is determined whether or not the PM removal from the filter 46 is required during propulsion while carrying a passenger.

If the first flag F1 is turned off so that the answer of step S31 is NO, the routine returns without carrying out the PM removal. By contrast, if the first flag F1 is turned on so that the answer of step S31 is YES, the routine progresses to step S32 to determine a satisfaction of the execution condition of the PM removal explained at step S22.

If the execution condition of the PM removal is not satisfied so that the answer of step S32 is NO, the routine returns. By contrast, if the execution condition of the PM removal is satisfied so that the answer of step S32 is YES, the routine progresses to step S33 to execute the PM removal from the filter 46. In order to execute the PM removal, at step S33, a required output power Pe of the engine 1 to execute the PM removal is calculated by adding a second amount W2 as an amount of increase in the output power of the engine 1 to execute the PM removal, to the required charging amount W to the battery 7. Specifically, the second amount W2 is set to a value possible to raise a temperature of the filter 46 to a level at which the particulate matter accumulating on the filter 46 is burnt, and the second amount W2 is smaller than the above-mentioned first amount W1 used to execute the PM removal in the case that the vehicle Ve is operated autonomously without carrying a passenger. Since the second amount W2 is smaller than the first amount W1, noises and vibrations resulting from raising the engine speed to carry out the PM removal may be reduced even if the PM removal is executed while carrying a passenger. If the engine speed is raised while decelerating the vehicle Ve or while the vehicle Ve is stopped, noises and vibrations may be increased by raising the engine speed. In order to avoid such disadvantage, an amount of increasing the output power of the engine 1 to execute the PM removal may be reduced while decelerating the vehicle Ve or while the vehicle Ve is stopped. Alternatively, such increase in the output power of the engine 1 to execute the PM removal may be inhibited while decelerating the vehicle Ve or while the vehicle Ve is stopped. In addition, as step S23 of the routine shown in FIG. 5, a temperature of the filter 46 may also be increased by supplying fuel from the fuel distribution valve 49 to the first exhaust pipe 43, and the PM removal may also be executed in combination with an ignition retard of the engine 1.

Then, it is determined at step S34 whether or not the temperature T of the filter 46 is equal to or higher than a threshold temperature T1. If the temperature T of the filter 46 is lower than the threshold temperature T1 so that the answer of step S34 is NO, the routine returns. By contrast, if the temperature T of the filter 46 is equal to or higher than the threshold temperature T1 so that the answer of step S34 is YES, the routine progresses to step S35 to execute air intake to the engine 1 so as to increase oxygen at the place where the filter 46 is arranged, and then the routine returns. As step S25 of the routine shown in FIG. 5, oxygen supply to the filter 46 may be increased by increasing air/fuel ratio of air/fuel mixture supplied to the cylinders 25. In this case, in order to reduce noises and vibrations resulting from carrying out the PM removal by raising the engine speed, it is preferable to reduce an amount of increasing the speed of the engine 1 to execute the PM removal.

Thus, according to the embodiment of the present disclosure, a control amount of output power of the engine 1 to heat the filter 46 is altered depending on a presence of a passenger in the vehicle Ve. According to the embodiment of the present disclosure, therefore, the particulate matter may be removed efficiently and promptly from the filter 46 in the case of propelling the vehicle Ve autonomously without carrying a passenger. By contrast, in the case of propelling the vehicle Ve while carrying a passenger, noises and vibrations resulting from execution of the PM removal may be reduced. In addition, in the case of propelling the vehicle Ve autonomously without carrying a passenger, the particulate matter may be removed further efficiently and promptly from the filter 46 by increasing the speed of the engine 1 to increase oxygen supply to the filter 46. By contrast, in the case of propelling the vehicle Ve while carrying a passenger, noises and vibrations resulting from execution of the PM removal may be further reduced by reducing an amount of increasing the speed of the engine 1 to execute the PM removal.

The routines shown in FIGS. 4 to 6 may be modified to carry out catalyst regeneration to eliminate sulfur oxide from the catalytic converter 44. The modification example will be explained hereinafter.

According to the modification example, in the routine shown in FIG. 4, sulfur oxide adsorbed to the catalytic converter 44 is detected at step S1, instead of the pressure difference ΔP. In this case, a light emitter is arranged at an appropriate place around the catalytic converter 44 to emit light to the catalytic converter 44, and a right receiver is arranged at a portion to be opposed to the light emitter across the catalytic converter 44. At step S1, specifically, sulfur oxide adsorbed to the catalytic converter 44 is detected based on a difference between an amount of light emitted from the light emitter and an amount of light received by the light receiver.

In this case, the first reference value α and the second reference value ß are set as reference values of the difference between the amount of light emitted from the light emitter and the amount of light received by the light receiver, and the second reference value ß is set smaller than the first reference value α. That is, the amount of light received by the light receiver is reduced with an increase in sulfur oxide adsorbed to the catalytic converter 44.

In the catalyst regeneration, temperatures of the catalytic converter 44 and the filter 46 are also raised to a similar target temperature at steps S23 and S33 as the case of the PM removal to eliminate sulfur oxide from the catalytic converter 44.

However, the catalyst regeneration does not require the oxygen supply to the filter 46 and hence steps S24, S25, S34, and S35 may be omitted. That is, in the catalyst regeneration, the catalyst is regenerated at step S23 and S33.

Thus, sulfur oxide may also be eliminated from the catalytic converter 44 by carrying out the catalyst regeneration.

The vehicle control system according to the embodiment of the present disclosure may also be applied to vehicles shown in FIGS. 7 to 14. In the following explanation, common reference numerals are allotted to the elements in common with those of the vehicle Ve shown in FIG. 1, and detailed explanation for the common elements will be omitted.

Figure 7:
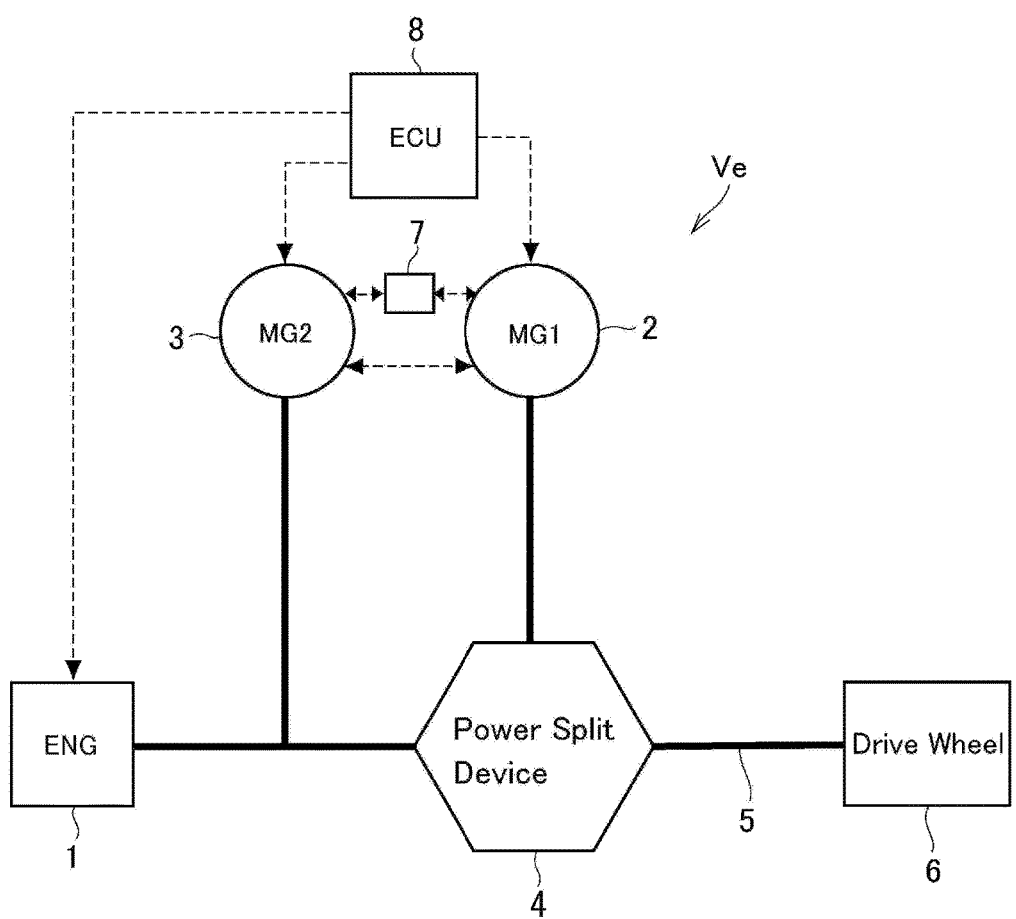
FIG. 7 is a schematic illustration showing a second example of a powertrain of the vehicle to which the control system according to the present disclosure is applied.

The vehicle Ve shown in FIG. 7 is also a hybrid vehicle in which the prime mover comprises the engine 1, the first motor 2, and the second motor 3. In the vehicle Ve shown in FIG. 7, the engine 1 and the second motor 3 are connected to the input element of the power split device 4, the first motor 2 is connected to the reaction element of the power split device 4, and the output member 5 is connected to the output element of the power split device 4. That is, the vehicle Ve shown in FIG. 1 is a so-called "output-split type" hybrid vehicle.

Figure 8:
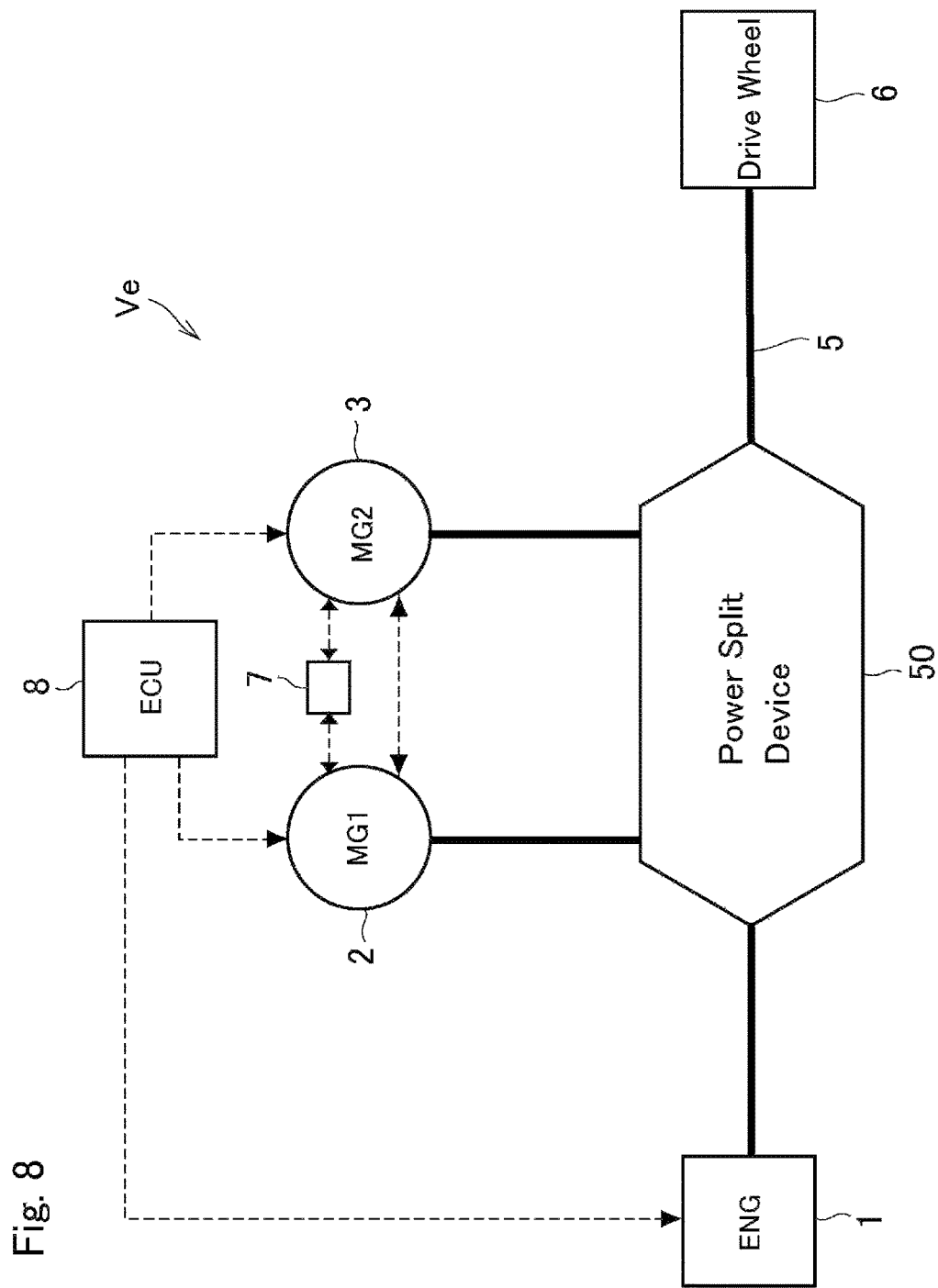
FIG. 8 is a schematic illustration showing a third example of a powertrain of the vehicle to which the control system according to the present disclosure is applied.

The vehicle Ve shown in FIG. 8 is a so-called "complex-split type" hybrid vehicle in which the prime mover also comprises the engine 1, the first motor 2, and the second motor 3. In the vehicle Ve shown in FIG. 8, a complex planetary gear unit formed by combining a pair of planetary gear units is used as a power split device 50, and the power split device 50 comprises four rotary elements. In the power split device 50, an input element is connected to the engine 1, the output element is connected to the drive wheels 6 through the output member 5, and remaining rotary elements are respectively connected to the first motor 2 and the second motor 3. The power split device 50 further comprises a clutch for switching a connection among the rotary elements and a brake for halting a rotation of the rotary element. That is, the power split device 50 may also serve as a transmission for altering a speed ratio between the input element and the output element.

Figure 9:
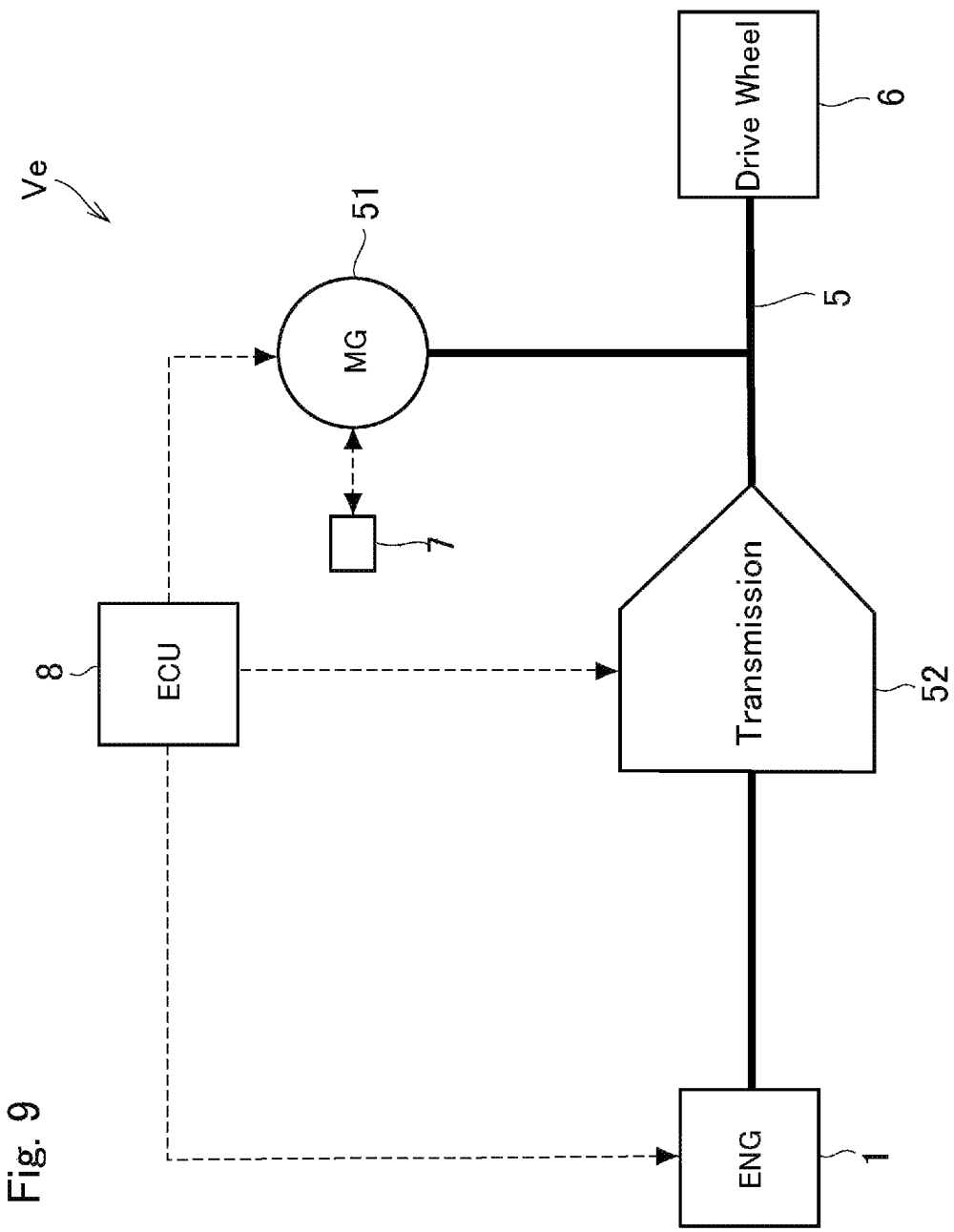
FIG. 9 is a schematic illustration showing a fourth example of a powertrain of the vehicle to which the control system according to the present disclosure is applied.
Figure 10:
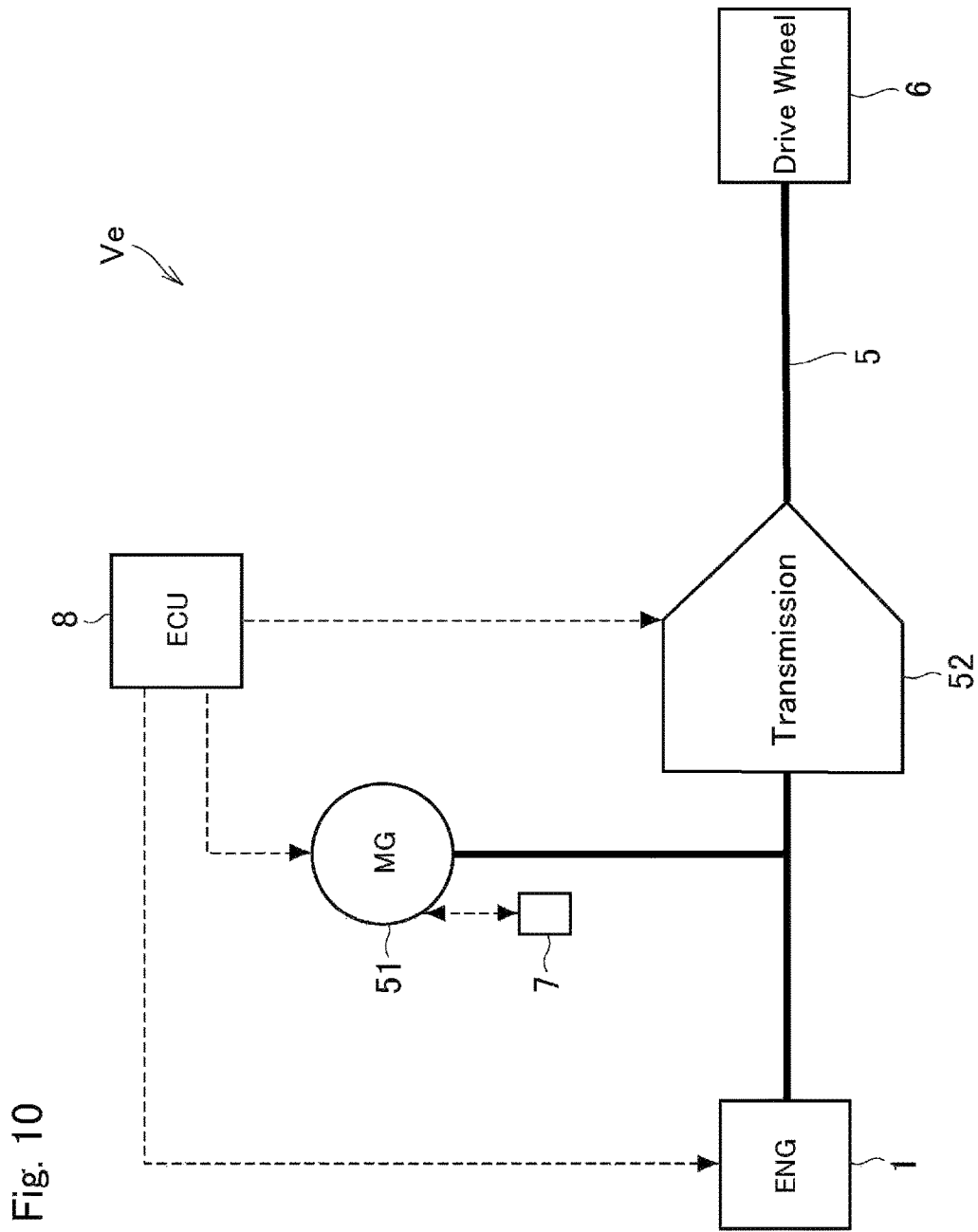
FIG. 10 is a schematic illustration showing a fifth example of a powertrain of the vehicle to which the control system according to the present disclosure is applied.
Figure 11:
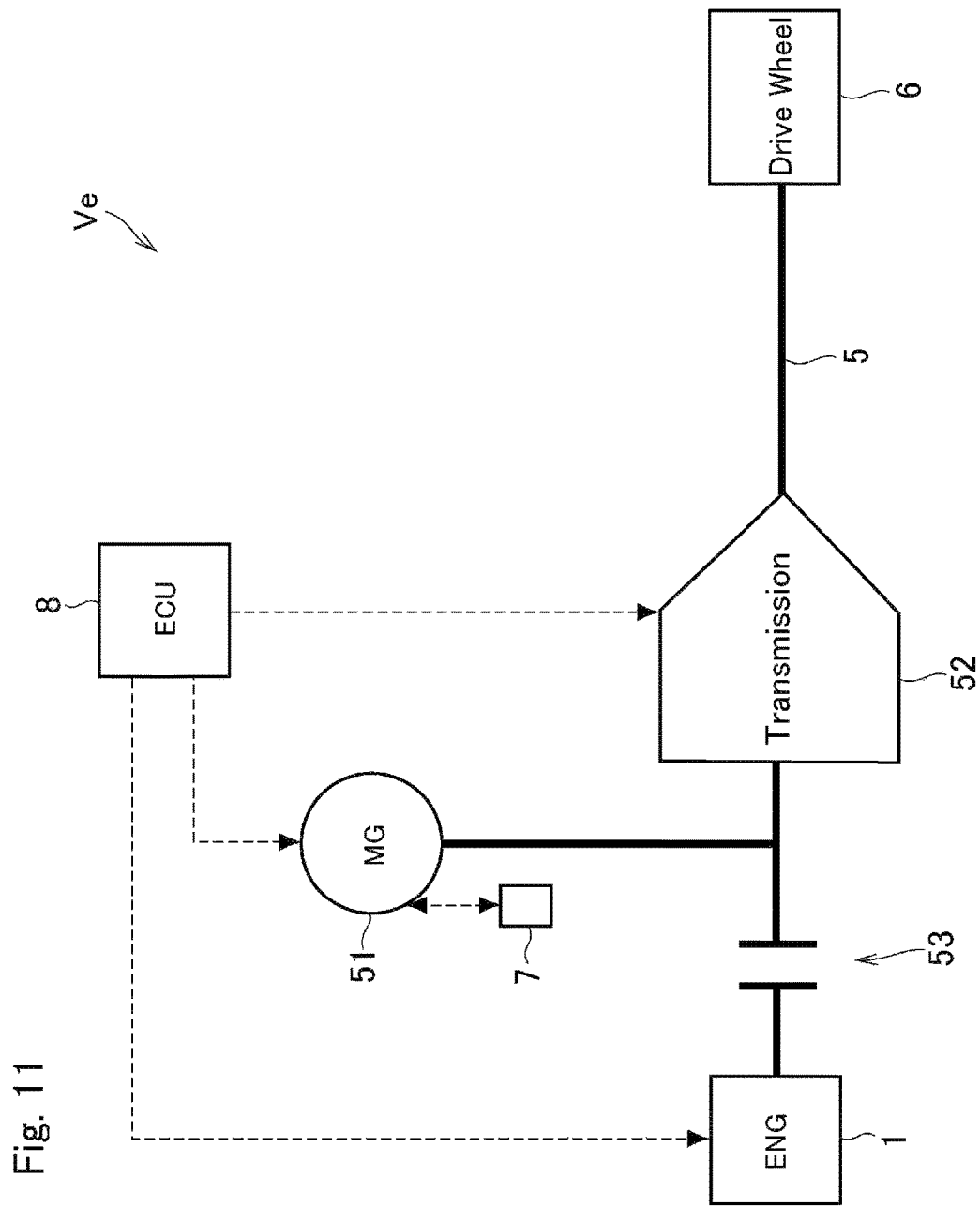
FIG. 11 is a schematic illustration showing a sixth example of a powertrain of the vehicle to which the control system according to the present disclosure is applied.

FIGS. 9, 10, and 11 respectively show a so-called "parallel-hybrid type" hybrid vehicle Ve in which the prime mover comprises the engine 1 and a motor-generator (referred to as "MG" in FIGS. 9, 10, and 11) 51. The hybrid vehicles Ve shown in FIGS. 9, 10, and 11 are individually provided with an automatic transmission 52 in which a gear stage is shifted stepwise or in which a speed ratio is varied continuously. In the vehicle Ve shown in FIG. 9, the engine 1 is connected to an input side of the transmission 52, and the motor-generator 51 is connected to an output side of the transmission 52 through the output member 5. In the vehicles Ve shown in FIGS. 10 and 11, the engine 1 and the motor-generator 51 are connected to the input side of the transmission 52, and the drive wheels 6 are connected to the output side of the transmission 52 through the output member 5. In the vehicle Ve shown in FIG. 11, a clutch 53 is disposed between the engine 1 and the transmission 52 to selectively interrupt power transmission therebetween.

Figure 12:
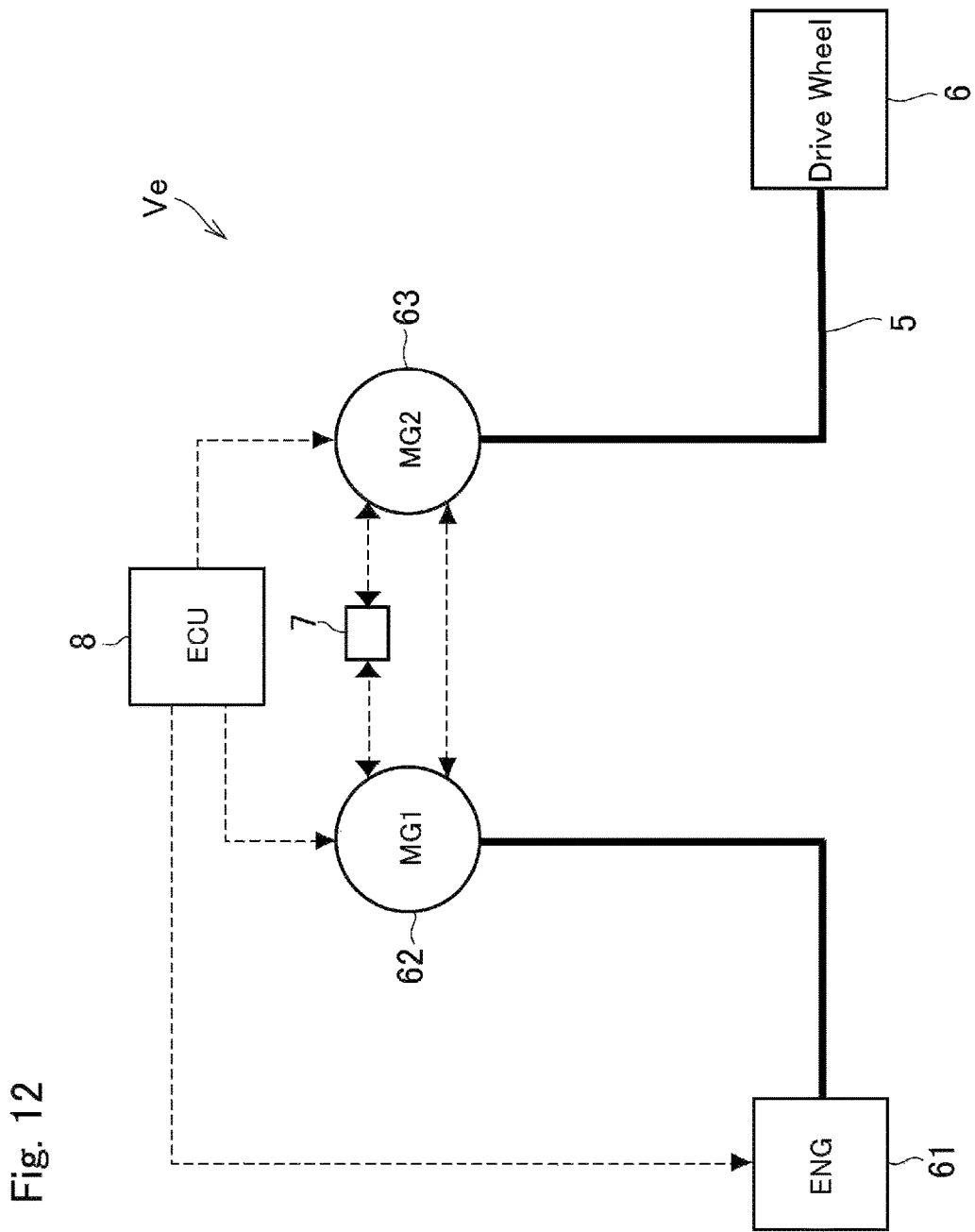
FIG. 12 is a schematic illustration showing a seventh example of a powertrain of the vehicle to which the control system according to the present disclosure is applied.

FIG. 12 shows a so-called "series-hybrid type" hybrid vehicle Ve in which the prime mover comprises an engine (referred to as "ENG" in FIG. 12) 61, a first motor (referred to as "MG1" in FIG. 12) 62, and a second motor (referred to as "MG2" in FIG. 12) 63. As the aforementioned engine 1, a gasoline engine or a diesel engine may also be used as the engine 61. Likewise, as the first motor 2 and the second motor 3, a motor-generator may also be used as the first motor 62 and the second motor 63. In addition, a generator having only a generating function may also be used as the first motor 62. In the vehicle Ve shown in FIG. 12, the engine 61 is connected to the first motor 62 so that the first motor 62 is driven by the engine 1 to serve as a generator, and the second motor 63 is connected to the drive wheels 6 through the output member 5. The first motor 62 and the second motor 63 are electrically connected to each other through the battery 7 (or a converter or an inverter) so that the second motor 63 is driven by electricity generated by the first motor 62.

Figure 13:
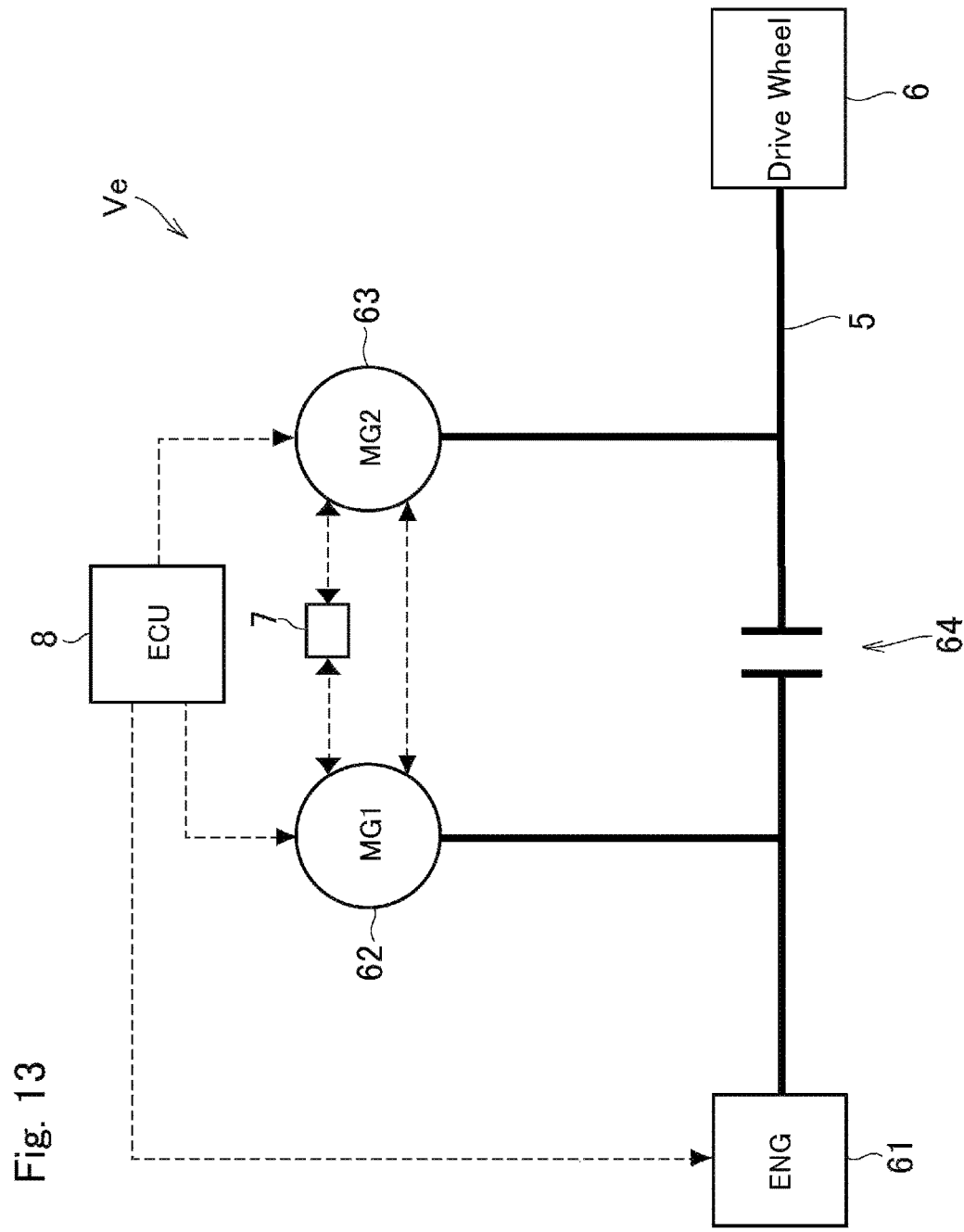
FIG. 13 is a schematic illustration showing an eighth example of a powertrain of the vehicle to which the control system according to the present disclosure is applied.

FIG. 13 also shows a hybrid vehicle Ve in which the prime mover comprises the engine 61, the first motor 62, and the second motor 63. In the vehicle Ve shown in FIG. 13, a clutch 64 is disposed between the engine 61 and the output member 5 to selectively interrupt power transmission therebetween. That is, the vehicle Ve shown in FIG. 13 serves as a series-hybrid type hybrid vehicle when the clutch 64 is disengaged, and serves as a parallel-hybrid type hybrid vehicle Ve when the clutch 64 is engaged.

Figure 14:
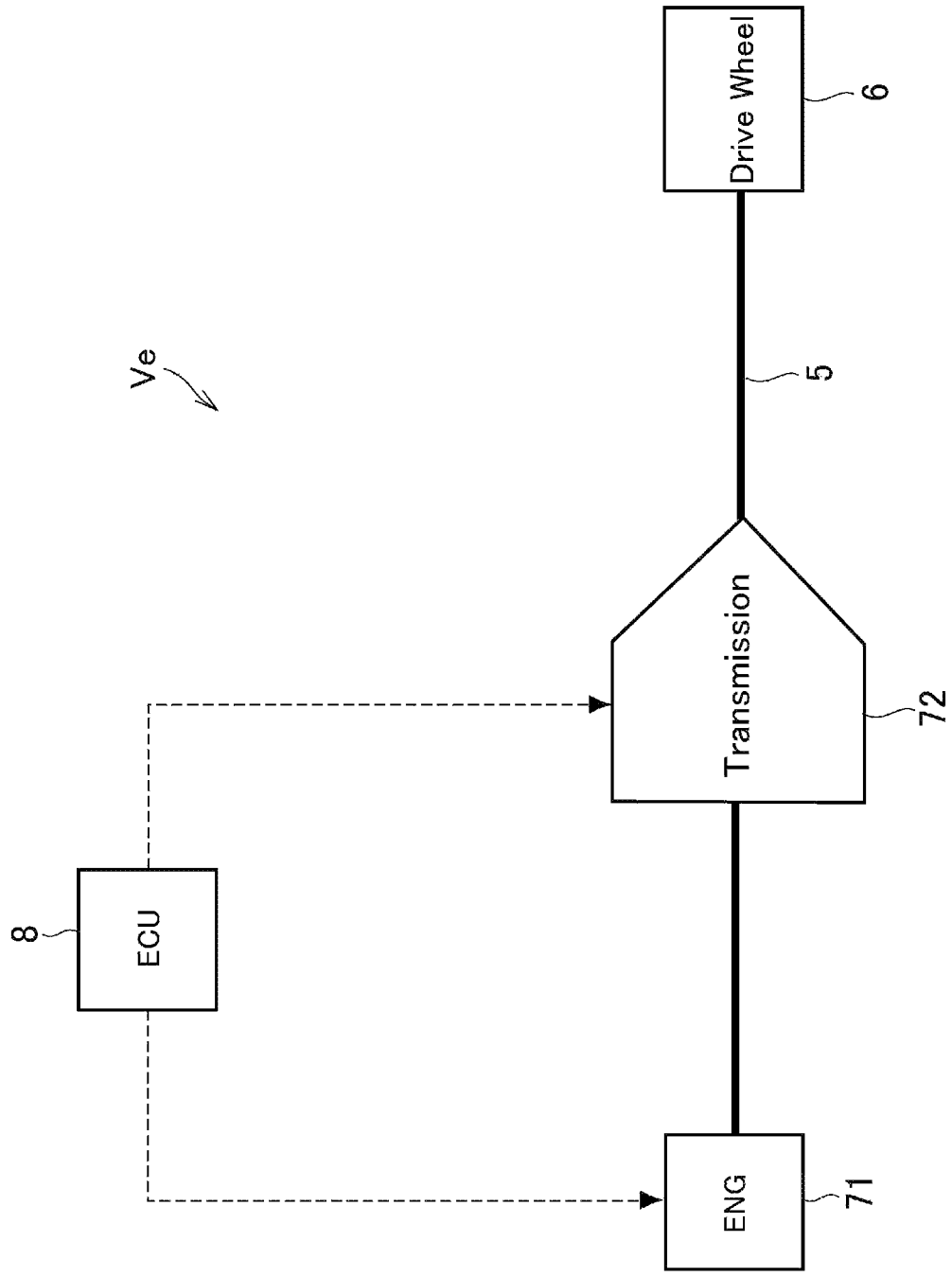
FIG. 14 is a schematic illustration showing a ninth example of a powertrain of the vehicle to which the control system according to the present disclosure is applied.

FIG. 14 shows a vehicle Ve in which only an engine 71 such as a gasoline engine and a diesel engine is used as a prime mover. The vehicle Ve shown in FIG. 14 is provided with an automatic transmission 72 in which a gear stage is shifted stepwise or in which a speed ratio is varied continuously. In the vehicle Ve shown in FIG. 14, the engine 71 is connected to an input side of the transmission 72, and the output member 5 is connected to an output side of the transmission 72. Thus, the vehicle control system according to the embodiment of the present disclosure may also be applied to a conventional vehicle powered by the engine.

Although the above exemplary embodiments of the present application have been described, it will be understood by those skilled in the art that the present application should not be limited to the described exemplary embodiments, and various changes and modifications can be made within the scope of the present disclosure.

What is claimed is:

1. A vehicle control system that is applied to a vehicle having an engine that generates power by burning fuel, and a purification system that purifies exhaust gas, comprising:
   a controller that operates the vehicle autonomously without requiring a manual operation, and that executes a removal control to remove deposition from the purification system;
   wherein the controller is configured to
   obtain an amount of deposition on the purification system, determine a presence of a passenger in the vehicle, and
execute the removal control when an amount of the deposition on the purification system exceeds a threshold value; and
the threshold value includes a first threshold value used in a case that the vehicle is propelled while carrying a passenger, and a second threshold value used in a case that the vehicle is propelled autonomously without carrying a passenger that is smaller than the first threshold value.

2. The vehicle control system as claimed in claim 1,
wherein the removal control includes a heating process to raise a temperature of the purification system by increasing an output power of the engine, and
wherein the controller is further configured to reduce an amount of increase in the output power of the engine to raise the temperature of the purification system in the case that the vehicle is propelled while carrying a passenger, in comparison with an amount of increase in the output power of the engine to raise the temperature of the purification system in the case that the vehicle is operated autonomously without carrying a passenger.

3. The vehicle control system as claimed in claim 2,
wherein the controller is further configured to:
execute the removal control upon satisfaction of at least any one of a first execution condition as an ambient environmental condition, and a second execution condition as a condition of the vehicle;
determine satisfaction of the execution condition while the vehicle is operated autonomously; and
inhibit the heating process if the execution condition is not satisfied.

4. The vehicle control system as claimed in claim 3,
wherein the first execution condition includes at least one of a fact that:
animals and pedestrians are not present around the vehicle;
the vehicle is travelling outside a residential area; and
the vehicle is not traveling in a closed area.

5. The vehicle control system as claimed in claim 3,
wherein the vehicle comprises:
a generator that translate the output power of the engine into electric power; and
an electric storage device that is charged with the electric power generated by the generator.

6. The vehicle control system as claimed in claim 5,
wherein the controller is further configured to:
calculate a required output power of the engine to execute the removal control based on an amount of increase in the output power of the engine to execute the removal control, and a required charging amount to the electric storage device; and
reduce the amount of increase in the output power of the engine to raise the temperature of the purification system in the case that the vehicle is propelled while carrying a passenger, in comparison with the amount of increase in the output power of the engine to raise the temperature of the purification system in the case that the vehicle is operated autonomously without carrying a passenger.

7. The vehicle control system as claimed in claim 5,
wherein the second execution condition includes at least one of a fact that:
the electric storage device is in condition possible to be charged with an expected electric power resulting from raising the temperature of the purification system; and
temperatures of the generator and the electric storage device are lower than a predetermined level.

8. The vehicle control system as claimed in claim 1,
wherein the deposition includes particulate matter,
wherein the purification system includes a filter, and
wherein the removal control includes a particulate matter removal control for removing the particulate matter from the filter by burning the particulate matter.

9. The vehicle control system as claimed in claim 8,
wherein the particulate matter removal control includes an air intake to the engine to raise a speed of the engine thereby increasing oxygen supply to the filter, and
wherein the controller is further configured to reduce an amount of increase in the speed of the engine to raise the temperature of the filter in the case that the vehicle is propelled while carrying a passenger, in comparison with an amount of increase in the speed of the engine to raise the temperature of the filter in the case that the vehicle is operated autonomously without carrying a passenger.

10. The vehicle control system as claimed in claim 1,
wherein the exhaust gas includes nitrogen oxide and sulfur oxide,
wherein the purification system includes a catalytic converter having noble metal for reducing nitrogen oxide,
wherein the deposition includes sulfur oxide, and
wherein the removal control includes a catalyst regeneration to eliminate sulfur oxide from the catalytic converter.

* * * * *